No. 872,950. PATENTED DEC. 3, 1907.
J. MACHTOLF.
APPARATUS FOR PRODUCING CARBON.
APPLICATION FILED JULY 2, 1907.
2 SHEETS—SHEET 1.
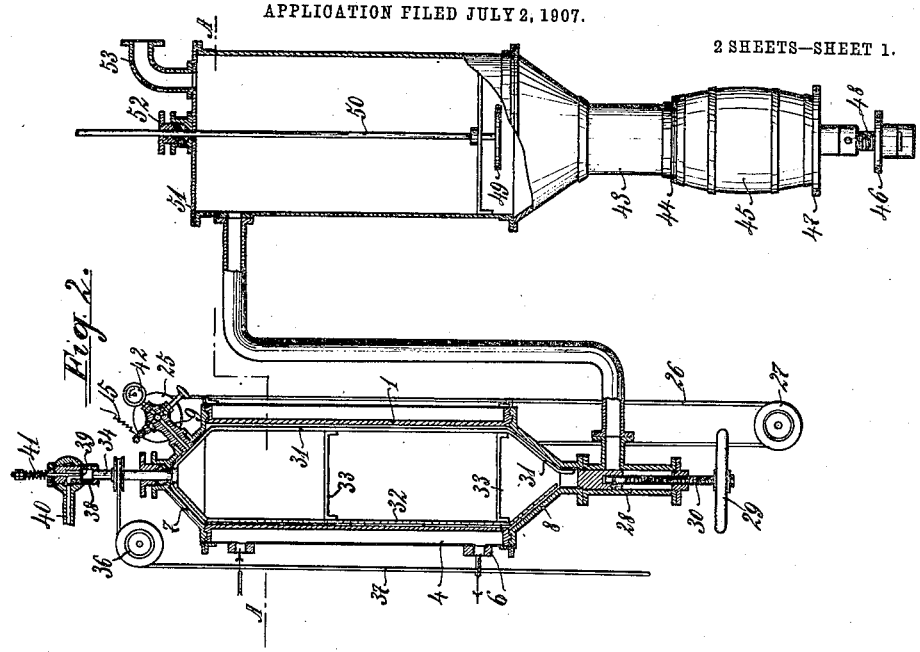
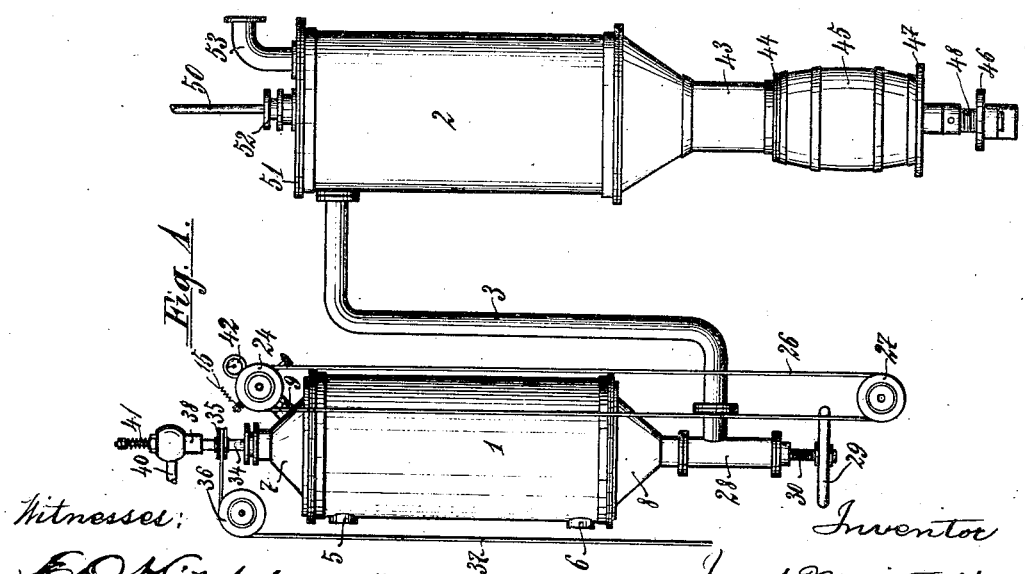
Witnesses:
E. O. Hildebrand
N. Reynolds
Inventor
Josef Machtolf
by George Massie
attorneys No. 872,950. PATENTED DEC. 3, 1907.
J. MACHTOLF.
APPARATUS FOR PRODUCING CARBON.
APPLICATION FILED JULY 2, 1907.
2 SHEETS—SHEET 2.
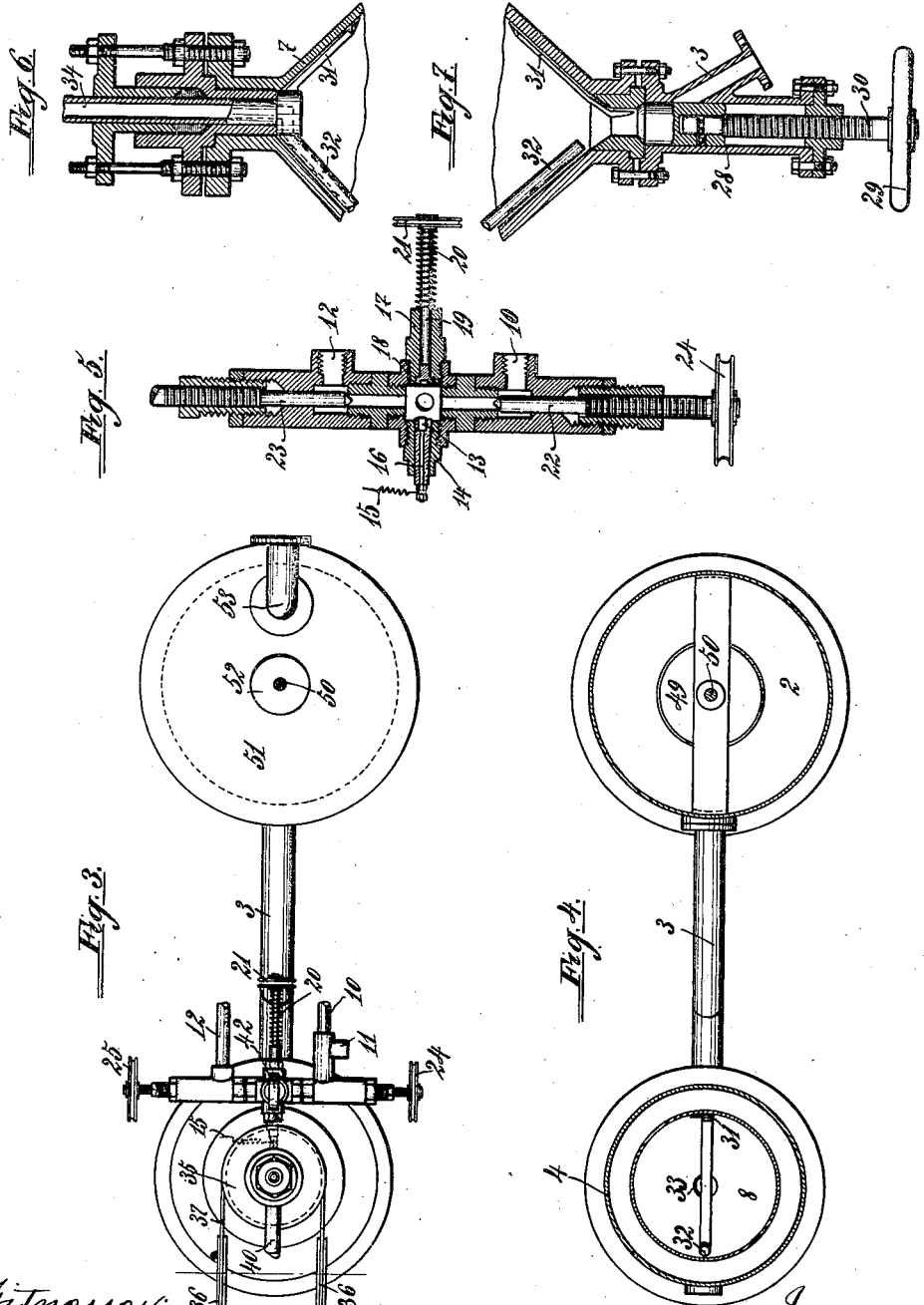

UNITED STATES PATENT OFFICE.

JOSEF MACHTOLF, OF BÖBLINGEN, GERMANY.

APPARATUS FOR PRODUCING CARBON.

No. 872,950.  Specification of Letters Patent.  Patented Dec. 3, 1907.

Original application filed March 9, 1907, Serial No. 361,548. Divided and this application filed July 2, 1907. Serial No. 381,921.

*To all whom it may concern:*

Be it known that I, JOSEF MACHTOLF, a subject of the King of Würtemberg, residing at Böblingen, in the Kingdom of Würtemberg, Germany, have invented certain new and useful Improvements in Apparatus for Producing Carbon; and I do hereby declare the following to be a full, clear, and exact description of the invention, such as will enable others skilled in the art to which it appertains to make and use the same.

This invention relates to apparatus for producing carbon and consists in an apparatus adapted to produce a dissociative explosion in oil gas and other similar, normally inexplosive gases rich in carbon whereby a soft lamp-black of desirable quality may be made; all as is more fully hereinafter set forth and claimed.

In another application, Ser. No. 361548, filed March 9, 1907, I have described and claimed a process of producing carbon blacks which consists essentially in producing a dissociative explosion of oil gas and similar carbon-rich gases of a normally inexplosive character; and the present application relates to an apparatus particularly adapted to carrying out the stated process.

In the prior art, lamp black has been produced by the explosion of acetylene, but in practice it has been found that this black is too hard and granular, lacking the smooth, oily glossiness which is desirable in pigment blacks. This low quality is largely due to the excessive high temperature produced in the explosion of acetylene which causes a molecular rearrangement of the carbon in harder form and also causes destruction of the soft oily or tarry bodies which usually accompany lamp black. In the manufacture of printers' ink this acetylene black is found to swell, which is a serious drawback, and for lithography it is found to lack gloss.

I have found that by heating to a suitable temperature, the normally inexplosive hydrocarbon gases can also be caused to undergo a dissociative explosion with the production of a carbon of much more desirable quality. These carbonaceous gases, are all endothermic in the union of hydrogen and carbon but not so highly so, as in the case of acetylene, as to cause ready explosion. And, being less endothermic their explosion must be facilitated by extraneous means and when produced does not yield the high temperature of the acetylene explosion. These means include preliminary heating, and, generally, some degree of pressure. By suitable regulation of the initial heat and of the initial pressure, upon development of a dissociative explosion, carbons of the most varied characters can be produced, suited, for instance, for india ink, ink, printers' ink, pencils, varnish pigments, arc carbons, etc.

As a suitable hydrocarbon, oil gas may be mentioned in the example of the process, but, as already stated, any hydrocarbon, such for instance as coal gas, gas from raw naphtha and the like may be easily dissociated, that is reduced to carbon and hydrogen.

As above observed the oil gas or other hydrocarbon must be heated previous to the decomposition, that is to say, it must be brought to the proper temperature for division. This can take place in various ways. In one arrangement the heating is effected by aid of the oil gas, acetylene, air or the like. In this manner the explosion chamber is gradually heated so that when it has reached the right temperature the addition is no longer necessary and gradually we can cease to make these additions and work with pure oil gas. When this latter is the case it suffices if there is added only a very small quantity of acetylene, air or the like, which merely suffices to commence the explosion.

According to another modification of the process the previous heating of the oil gas can be effected by heating the apparatus with super-heated steam and at the same time regulating the initial pressure of the gas in the apparatus so that the dissociation takes place. In consequence of the heat liberated by the explosion the steam used for the heating will be still further heated, which has the advantage that the initial pressure in the apparatus may be diminished, initial heat and initial pressure being to some extent reciprocal.

After the explosion has taken place the carbon is collected in a receptacle from which it is filled into barrels.

The obtaining of the carbon is accompanied by the utilization of the liberated hydrogen, which latter can be drawn off from the receptacle into a special container.

The steam necessary for the preliminary heating of the apparatus can also be obtained in various ways; for instance it can be obtained by bringing a mixture composed of acetylene and oil gas to explosion and the heat thus liberated may be used for the heating of a water jacket arranged around the explosion apparatus.

Substantially pure hydrogen is produced in the operation of the apparatus and this may be elsewhere utilized.

The above described process takes place with entire exclusion of air, when in regular operation and is perfectly harmless and free from dust and smell. It should further be remarked that according to the present process it is possible to not only produce enormous quantities of carbon with a small amount of labor, but it is also possible to produce the carbon in any desired condition; moreover, the production costs are far smaller than hitherto. Exact calculations have shown that the oil gas carbon is six times as cheap as acetylene carbon and is nevertheless better than the same. Experiments which have been made by experts have further shown that a carbon which for instance has been produced from 60% oil gas and 40% acetylene is specifically lighter than acetylene carbon, its weight relative to the latter being in the ratio of about .968 to 1. The oil gas carbon is much more finely divided and therefore is softer, wherefore it does not swell up when ground for the production of printers' ink, and moreover it can be very easily mixed with water, which with acetylene carbon is not immediately the case.

In the accompanying drawing is illustrated an apparatus by way of example suitable for the carrying out of this process.

In these drawings Figure 1 shows a view of the apparatus together with the collector; Fig. 2 is a longitudinal section thereof; Fig. 3 a view from above; Fig. 4 a horizontal section on the line A—A of Fig. 2; Fig. 5 a section through the gas inlet head. Fig. 6 a section through the stuffing box of the agitator; Fig. 7 a section through the lower closing valve of the dividing apparatus.

The apparatus consists of the explosion cylinder 1 and the carbon collector 2 which stand in communication with one another by means of the tube 3. In the cylinder 1 the hydrocarbon gas is decomposed into carbon and hydrogen and the carbon separating itself as lamp black is conveyed to the collector 2. The cylinder 1 formed of cast steel is provided as shown in Figs. 2 and 4 with a hollow jacket 4, which is intended for the reception of the oil, water or steam used for the preliminary heating. For this purpose there is placed at the upper part of the jacket 4 a projection 5 which acts either as a steam inlet or as oil outlet and the projection 6 at the lower part of the jacket serves in like manner either as a steam outlet or an oil inlet.

At the top the cylinder is closed by means of a cast steel cover 7 and underneath it is closed by a similar cast steel bottom 8. To the cover 7 there is attached the gas inlet head 9 which as shown in Figs. 3 and 5 serves to carry on the one hand the ignition device and on the other hand the gas inlet and outlet valves. The oil gas serving for the preparation of the lamp black is supplied through the projection 10, and through the projection 11 a priming gas (acetylene, air, or the like,) is introduced. Through the projection 12 the hydrogen formed on the decomposition is removed. The projections 10, 11 and 12 are capable of being closed by the valves 22, 23 which can be effected by means of the wheels 24, 25. As these wheels are placed at a considerable height they are preferably connected by means of the strap 26 with an easily reached wheel 27 (see Figs. 1 and 2).

The ignition device consists of the ignition electrode 13 placed in a projection 14 provided with electric lead 15, which electrode is surrounded by an insulating box 16; the whole having a construction similar to that employed with gas engines.

In order to be able to cleanse the ignition device and the insulating box when required, there is provided in front thereof in the part 17, a spindle 19 placed in the front part 18. This spindle 19 stands under the pressure of a spring 20 and is operated by means of a wheel 21. The wheel 21 can be connected by means of a strap with a second wheel so that the cleansing can take place from any point.

The spindle 19 has two purposes; on the one hand, in starting the apparatus, by pressing it in and then releasing it, the first spark or the first explosion is obtained. This manipulation is necessary several times until a deposit of carbon has taken place in the insulating box 16 which stops the entry of gases into it. This deposit now causes a short-circuit and the spark is produced as soon as the current circuit is closed. In this manner there is formed a veritable spark producer. On the other hand the spindle, as already stated, serves for cleaning the insulating box, if it should happen that too much lamp black is collected in this apparatus, in which case the current would pass over without sparking. This accident, however, can very rarely happen because in the inrush of the gases the lamp black is always carried forward with them.

The gas head 9 is further provided with a pressure gage 42 in order to indicate the gas pressure at all times. On the projection 28 of the base 8 there is a closing valve 30 provided with a wheel 29 which valve has for its purpose to interrupt the connection with the collector 2 during the decomposition of the hydrocarbon gas. In Fig. 7, this lower part is illustrated on a larger scale.

Within the cylinder 1 there is placed a stirrer which serves to prevent any adherence of the lamp black formed by the decomposition of the hydrocarbon gas to the cylinder walls. The stirrer consists as to one half of a blade 31 fitting close to the cylinder wall, and as to the other half of a steel tube 32 provided with holes (Figs: 2, 4, 6, 7). The actuation of the stirrer is effected by means of the wheel 35 placed upon the hollow axle 34 which wheel can also be operated from below by means of a wheel 36 and a strap 37. Upon the hollow axle 34 there is a revoluble valve body 38 (Fig. 2) which possesses a spring back pressure valve 39 and a projection 40, which serves for the introduction of hydrogen and can be placed in communication with the same hydrogen container as the outlet piece 12.

In order to insure that the valve 39 is closed before the explosion of the hydrocarbon gas begins, it is advisable to provide the back pressure valve 39 with a lever (not shown) for the motion thereof, so that hydrogen passing through the part 40 may not be opposed by the spring 41. The back pressure valve 39 is formed as a conical valve on which the element 40 can rotatably move.

In the collector there is, as stated, the lamp black gathered from the cylinder 1. In order to facilitate the removal of this black it is advisable to make use of the apparatus shown in Figs. 1 and 2. Beneath the prolongation 43 of the container 2 is provided a soot catcher 45, a tight joint being made between the two by rubber gasket 44. A threaded spindle 48, seated in 46, and provided with plate 47 can be operated to press the soot catcher upwards against the gasket and element 43.

Compression of the lamp black into the barrel 45 takes place by means of a piston 49, the rod 50 whereof passes through a stuffing box 52 secured above to the cover 51 of the receptacle 2. The actuation of the piston may be performed by means of a suitable transmission device from any convenient point. To the cover 51 of the receptacle 2 there is attached a tube 53 which stands in connection with a dust collecting device not shown in the drawing. The operation of the apparatus described is as follows:

When using oil gas with acetylene or the like, and starting the apparatus the hollow jacket 4 is filled with gas oil and the tube 5 brought into connection with the oil gas producer (not shown) so that the previously heated oil can flow through the projection 5 while there is introduced through the projection 6 enough cold oil to insure that the cylinder 1 always maintains the desired temperature. Before, however, the first explosion is brought about oil gas is admitted through the projection 10 into the apparatus until all the air is driven out. In subsequent operation, the hydrogen remaining in the cylinder may be similarly displaced. Any hydrogen not displaced and remaining in the oil gas does no harm. The valve 30 is then closed and through the projection 11 acetylene gas under a pressure of about four atmospheres is introduced into the cylinder. Then the valve 22 connected to the gas head is closed and the mixture of gas which is now in the cylinder 1 is made to explode by means of the ignition device 13, whereupon the mixture of oil gas and acetylene is decomposed into carbon and hydrogen. The valve 23 is then opened and the liberated hydrogen is drawn off into a gas holder (not shown) through the connection 12. This gas holder is composed of a closed vessel which may suitably have the same capacity as the cylinder so that in the cylinder and in the hydrogen holder the same pressure prevails. The hydrogen valve 23 is then closed and the stirrers 31, 32 of the collecting vessel 2 are set in motion. While the stirrers are in operation the valve 30 is opened, whereby the hydrogen still remaining in the cylinder 1 drives the carbon, that is to say, the lamp black into the collector 2. As soon as the pressure in the cylinder 1 disappears the back pressure valve 39 opens and hydrogen flows inward through the projection 40 and hollow axle 34 into the steel tube 32 of the stirrer and outward through its perforations, whereby any carbon still remaining on the inner wall of the cylinder 1 is entirely blown away. Whatever therefore, has not been scraped off by the knife 31 is entirely removed by means of the hydrogen flowing through the tube 32. After the carbon has been thoroughly removed from the cylinder 1, in this manner the agitator is stopped, the valve 30 is closed, and by opening the valve 23 the cylinder is again filled with gas for the purpose of another explosion. Through the heat caused by the successive explosions the cylinder becomes more and more heated. With a previous warming to 300° centigrade a mixture of 90% oil gas with 10% acetylene suffices in order to bring about the reaction. With a temperature of 350° to 380° centigrade in the container, traces of acetylene are necessary to cause the explosion of oil gas. When the apparatus is full of oil gas under the desired pressure, which may be two or three atmospheres, about one-fifth of a liter of acetylene gas is pumped in through 11 into the head 9 by means of a hand pump. In this manner there is provided in the hollow space of the head 9 an easily explosible mixture which suffices to bring about the reaction.

In place of the acetylene another explodible priming gas may be used in the same manner. As has been shown by experiment a few cubic centimeters of air may be pumped in without danger. The pressure and the temperature must of course always be regulated according to the kind of gas which is being used, and in the case of a gas richer in carbon it is possible to operate at considerably lower pressure and temperature than with a gas poorer in carbon. Moreover it is possible to operate by mixing gases of different percentages of carbon and dispense with the use of acetylene gas at all. By using different mixtures of the gases it is further possible to make a softer or harder lamp black according to requirements.

The hydrogen which was introduced into the collector 2 is taken through the tube 53 into a receptacle (not shown) which serves as a soot collector, small quantities of lamp black being carried along by the hydrogen.

In order to utilize the process for oil gas without using acetylene or the like superheated steam is introduced through the projection 5 and the cylinder is heated in this manner. The cooled steam or the condensed water is drawn off through the port 6. After the apparatus is heated up to about 150° centigrade if there be used a gas which does not decompose at this temperature under a pressure of about five atmospheres, then the pressure must be so far increased that the decomposition can take place. The heat liberated by the explosion will soon bring the apparatus to a temperature at which working under lower pressure is possible. However, an explosive priming gas, such as acetylene or a little air admixed with the gas in the head of the cylinder may also be here used in starting.

When the collector 2 is filled with carbon, which of course only occurs after a whole series of explosions, the carbon is filled into delivery cask 45 in the manner already set forth. In this connection it must be further observed that the motion of the aforesaid pressure piston 49 can be effected either by hand or by machinery. When the piston is in its lowermost position it closes the collector 2 tightly so that no hydrogen can escape. The upward access of air in any material amount into the collector will not occur because in consequence of the difference of specific gravity between air and hydrogen though hydrogen will escape downward no air can enter the collector during the brief time the apparatus is open.

By means of a corresponding device it is even possible to fill the casks with hydrogen or to drive out the air from them before the piston 49 is raised. For this purpose it suffices to make a little hole at the top and sidewise underneath in the cask 45 and to bring these holes into connection with hydrogen supply pipe so that the air is driven out of the casks from above downwards. This is, however, not of importance because the excess of hydrogen is always so great that an accidental explosion can never take place. This excess of hydrogen may be burned under the oil gas retorts. Moreover, it is very improbable that an ignition in the apparatus or in the collector 2 will take place, because the lamp black is never delivered to it at such a temperature that it can ignite as has been experimentally proved. The expansion of the gases in emptying the cylinder cools down the carbon.

In using a plurality of explosion cylinders, it is not necessary to employ a special steam generator to furnish steam for heating the jackets since one such device may be employed to furnish steam for the others. For instance one such device may have its jacket supplied with water and be used to explode a mixture of 80 per cent. acetylene and 20 per cent. oil gas. The heat developed from such a mixture will furnish plenty of steam. It is also possible to use another such device to superheat the steam furnished by the first. By heat-insulating the steam conduits in the usual way, dry hot steam may be delivered from one such device, functioning as a steam generator into the jackets of the other devices.

In the normal operation of the apparatus here shown an excess of heat is generated and this may be employed in any suitable manner. The large quantity of hydrogen produced may also be employed in any suitable manner, as, for instance, in heating oil gas retorts supplying oil gas to the apparatus, for forming ammonia with nitrogen, in motors, or for forming acetylene by uniting it with carbon.

The attention to the whole apparatus can be effected from any point. It is therefore not necessary that the workmen are placed in the same room as the apparatus. The arrangement can also be constructed so as to work continuously and automatically without the necessity for manual operation of valves and the like, by the use of suitable gearing and other mechanism.

Having thus fully described my invention, what I claim as new, is:—

1. In an apparatus for the production of amorphous carbon, the combination, with a decomposition chamber provided with controllable means for producing explosive decomposition therein, of a collection chamber, a conduit connecting the decomposition chamber with the collection chamber, and means for controlling the conduit.

2. In an apparatus for the production of amorphous carbon, the combination, with a decomposition chamber, means for supplying an explosive fluid thereto, and controllable means for igniting said fluid explosively, of a collection chamber, and means for putting the collection chamber and the decomposition chamber in connection with each other.

3. In an apparatus for the production of amorphous carbon, the combination, with a decomposition cylinder, means for supplying an explosive hydrocarbon mixture to the same, and means for igniting said mixture explosively, of means for removing soot from said explosion chamber, and a scraper mechanism within the decomposition chamber.

4. In an apparatus for the production of amorphous carbon, the combination, with a decomposition chamber provided with controllable means for producing explosive decomposition therein, of a collection chamber connected therewith, and means for removing soot from the collection chamber.

5. In an apparatus for producing amorphous carbon, the combination, with a decomposition chamber provided with controllable means for producing explosive decomposition therein, and a collection chamber connected thereto, of means for attaching a receptacle to the collection chamber, and means for discharging the contents of the collection chamber into the receptacle.

6. In an apparatus for producing amorphous carbon, the combination, with a decomposition chamber provided with controllable means for producing explosive decomposition therein, of a scraping mechanism arranged to scrape the interior walls of the decomposition chamber, said scraping mechanism comprising a perforated tube arranged to discharge a fluid against said walls.

7. In an apparatus for producing amorphous carbon, the combination, with a decomposition chamber provided with controllable means for producing explosive decomposition therein, of a rotatable scraping mechanism having a hollow axis, a valve body with which said axis communicates, means for supplying a fluid to said valve body, and a valve in the valve body.

8. In an apparatus for producing amorphous carbon, the combination, with a decomposition chamber provided with controllable means for producing explosive decomposition therein, and a collection chamber valve connected therewith, of a compacting and discharging piston movable in said collection chamber, and means for moving said piston to discharge the contents of the collection chamber.

9. In an apparatus for producing amorphous carbon, the combination, with a decomposition chamber, provided with controllable means for producing explosive decomposition therein, and having in open but closable connection therewith a collection chamber having a cover, of a piston in the collection chamber, a piston rod connected to the piston, a packing gland on the cover of the collection chamber, through which the piston rod passes, and a connection between the decomposition chamber and the collection chamber.

In testimony whereof I hereunto affix my signature in the presence of two witnesses.

JOSEF MACHTOLF.

Witnesses:
ADOLF LEBHERS,
ERNEST ENTENMANN.